(12) United States Patent
Shiga et al.

(10) Patent No.: US 9,732,888 B2
(45) Date of Patent: Aug. 15, 2017

(54) EXTERNAL COVER MATERIAL FOR WIRE HARNESS

(75) Inventors: Kouki Shiga, Yokkaichi (JP); Hidetoshi Sugino, Yokkaichi (JP)

(73) Assignee: SUMITOMO WIRING SYSTEMS, LTD., Mie (JP)

( * ) Notice: Subject to any disclaimer, the term of this patent is extended or adjusted under 35 U.S.C. 154(b) by 422 days.

(21) Appl. No.: 14/380,503

(22) PCT Filed: Jul. 2, 2012

(86) PCT No.: PCT/JP2012/066858
§ 371 (c)(1),
(2), (4) Date: Aug. 22, 2014

(87) PCT Pub. No.: WO2013/125062
PCT Pub. Date: Aug. 29, 2013

(65) Prior Publication Data
US 2015/0020911 A1    Jan. 22, 2015

(30) Foreign Application Priority Data

Feb. 24, 2012   (JP) ................................. 2012-038805

(51) Int. Cl.
*F16K 11/00*   (2006.01)
*F16L 9/02*   (2006.01)
(Continued)

(52) U.S. Cl.
CPC ............ *F16L 9/02* (2013.01); *B60R 16/0215* (2013.01); *H01B 19/00* (2013.01); *H02G 3/0481* (2013.01); *Y10T 29/49117* (2015.01)

(58) Field of Classification Search
CPC ............................... F16L 9/02; B60R 16/0215
(Continued)

(56) References Cited

U.S. PATENT DOCUMENTS 1,856,109 A * 5/1932 Murray ................ H01B 9/0666
138/108
2,204,737 A * 6/1940 Swallow ............ H01B 11/1834
174/28
(Continued)

FOREIGN PATENT DOCUMENTS

JP   A 2011-146628    7/1920
JP   U1 59-189417    12/1984
(Continued)

OTHER PUBLICATIONS

Aug. 28, 2012 Search Report issued in International Patent Application No. PCT/JP2012/066858 (with translation).

*Primary Examiner* — Vishal Pancholi
(74) *Attorney, Agent, or Firm* — Oliff PLC (57) ABSTRACT

Embodiments of the present application provide better configurations of a partition-attached metal pipe as an external cover material for a wire harness, including: a metal pipe through which a wire harness including a plurality of electrical wires can be inserted; and a separate metal partition member that is to be assembled by being inserted into the pipe; wherein a plurality of electrical wire insertion spaces that are partitioned by the partition member and a circumferential wall of the pipe are provided continuously in an axial direction of the pipe.

13 Claims, 6 Drawing Sheets

(51) Int. Cl.
*B60R 16/02* (2006.01)
*H02G 3/04* (2006.01)
*H01B 19/00* (2006.01)

(58) Field of Classification Search
USPC .......................................... 138/108, 112, 166
See application file for complete search history.

(56) References Cited

U.S. PATENT DOCUMENTS

| | | | | |
|---|---|---|---|---|
| 3,110,754 | A * | 11/1963 | Witort | H02G 3/0481 |
| | | | | 138/114 |
| 4,456,331 | A * | 6/1984 | Whitehead | G02B 6/4407 |
| | | | | 385/103 |
| 4,759,516 | A * | 7/1988 | Grose | B64C 21/10 |
| | | | | 138/38 |
| 5,238,328 | A * | 8/1993 | Adams | F16L 58/1045 |
| | | | | 138/141 |
| 5,406,032 | A * | 4/1995 | Clayton | H02G 3/083 |
| | | | | 174/151 |
| 2011/0155419 | A1 * | 6/2011 | Clark | H01B 11/06 |
| | | | | 174/130 |

FOREIGN PATENT DOCUMENTS

| | | |
|---|---|---|
| JP | A 2000-287324 | 10/2000 |
| JP | A 2004-224156 | 8/2004 |
| JP | A 2006-269201 | 10/2006 |

* cited by examiner

EXTERNAL COVER MATERIAL FOR WIRE HARNESS

CROSS-REFERENCE TO RELATED APPLICATIONS

This application claims priority to International Application No. PCT/JP2012/066858, filed on Jul. 2, 2012, and to Japanese Patent Application No. 2012-038805, filed on Feb. 24, 2012, the disclosures of both of which are incorporated herein by reference in their entireties.

TECHNICAL FIELD

Embodiments of the present application relate to an external cover material for a wire harness, and specifically relates to a pipe through which can be inserted a wire harness including high-voltage electrical wires that are to be arranged under a floor of an electric automobile or a hybrid automobile.

BACKGROUND

Conventionally, in hybrid automobiles or electric automobiles, a wire harness arranged between a battery and an inverter, between an inverter and a motor, or the like includes high-voltage electrical wires that generate noise. Thus, there are cases in which the wire harness is arranged in an underfloor region below a floor panel, and, in the underfloor region, the wire harness is inserted through a metal pipe in order to protect the wire harness and to provide a shield from the high-voltage electrical wires.

For example, according to a cable holding structure provided by JP 2004-224156A, a wire harness including three-phase high-voltage cables that connect an inverter mounted on the rear side of an automobile and a motor mounted in an engine room is arranged under a floor. In the underfloor region, the high-voltage cables are one by one inserted through a protective pipe made of metal.

Figure 12:
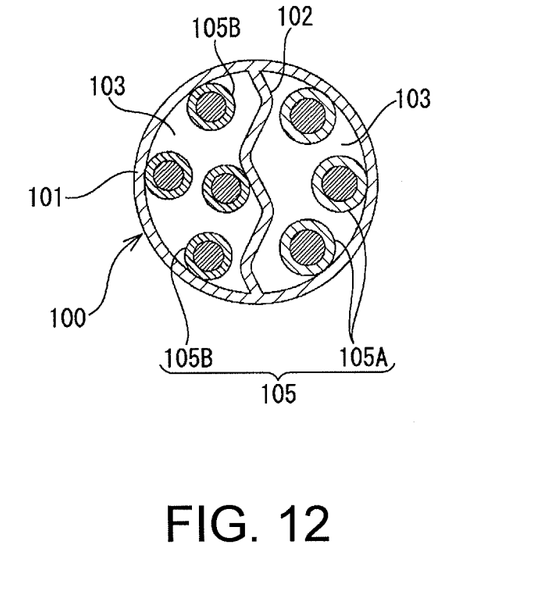
FIG. 12 shows a cross-sectional view of a conventional example.

Furthermore, according to a shielding conductive path provided by JP 2011-146228A, as shown in FIG. 12, a metal pipe 100 is provided unitarily with a partition member 102 that projects from the inner face of a circumferential wall 101, and electrical wires 105 forming a wire harness are separately inserted through a plurality of insertion spaces 103 that are partitioned by the partition member 102. That is to say, the electrical wires 105 are separately inserted through the insertion spaces 103 as power-supply electrical wires 105A that are high-voltage electrical wires, and low current-based electrical wires 105B, so that the influence of electromagnetic noise generated by the power-supply electrical wires 105A, on the low current-based electrical wires 105B, is reduced and prevented.

If a wire harness including a plurality of electrical wires is inserted through one metal pipe 100 as disclosed in JP 2011-146228A, the number of metal pipes 100 necessary is only one. Thus, this configuration is advantageous in that the weight can be reduced and the cost can be lowered. This metal pipe is produced by extrusion molding of molten metal. According to embodiments of the present application, the metal pipe provided with the partition member is also produced by extrusion molding such that the circumferential wall and the partition member are unitarily formed.

The metal pipe may be such that the circumferential wall has a wall thickness larger than that of the partition member to increase the protective function, and that the partition member has a small wall thickness to increase the volume of the partitioned insertion spaces. However, it is not easy to partially change the wall thickness in extrusion molding of molten metal, and, thus, a sufficient level of precision may not be realized. Furthermore, it is difficult to make the wall thickness of the partition member very small. Moreover, extrusion dies for production have to be newly prepared, for example, when changing the wall thickness of the partition member while maintaining the same outer diameter of the metal pipe, when changing the shape of the partition member, or, conversely, when changing the wall thickness of the circumferential wall while maintaining the same partition member, and, thus, the production cost may increase.

Furthermore, although the configuration in which a partition member is provided is advantageous in that the influence of noise between electrical wires inserted through one metal pipe can be reduced and prevented, the providing a partition member without changing the outer diameter may reduce the volume of the insertion spaces, thereby making it difficult to insert the electrical wires therethrough, and causing contact of the electrical wire coating layer with the partition member or the circumferential wall at the time of insertion and damaging these portions.

SUMMARY

Embodiments of the present application have been made in view of these problems, and it is an object thereof to provide an external cover material for a wire harness, constituted by a metal pipe through which a wire harness including a group of a plurality of electrical wires can be inserted, wherein a wall thickness of a partition member disposed inside the metal pipe can be easily made different from and smaller than a wall thickness of the metal pipe, the shape of the partition member can be easily changed, and the electrical wires of the wire harness can be easily separately inserted through the metal pipe provided with the partition member.

In order to achieve the above-described object, a first aspect of the present application is directed to an external cover material for a wire harness, including:

a metal pipe through which a wire harness including a plurality of electrical wires can be inserted; and a separate metal partition member that is to be assembled by being inserted into the pipe;

wherein a plurality of electrical wire insertion spaces that are partitioned by the partition member and a circumferential wall of the pipe are provided continuously in an axial direction of the pipe, fitting depressions, into which projecting edges at an outer circumference of the partition plates of the partition member are fitted, extend in the axial direction in an inner circumferential face of the pipe, and are provided in the inner circumferential face of the pipe at a constant pitch in a circumferential direction of the pipe, and the edges at the outer circumference of the partition plates are fitted into the fitting depressions at any position of the fitting depressions provided at the constant pitch, and each of the fitting depressions is a depression having a trapezoidal shape in which both side faces widen in an inward radial direction of the pipe.

According to embodiments of the present application, the pipe and the partition member are produced by extrusion molding of molten metal such as aluminum-based metal, wherein the pipe is constituted only by a circumferential wall surrounding a hollow portion, and has any one of a circular, a substantially flat oval-like, or an elliptical cross-section, and wherein the partition member is shaped such that a plurality of partition plates are radially connected to each other, or such that a plurality of partition plates are provided as teeth that project from a coupling plate.

According to embodiments of the present application, the radially-shaped partition member is attached into the pipe having a circular cross-section, and the comb-like partition member is attached into the pipe having a flat oval-like or elliptical cross-section.

According to embodiments of the present application, it may be that each of the partition plates is provided, at the middle in the radial direction, with at least one bent portion.

According to embodiments of the present application, the pipe and the partition member are made of the same metal such as the aluminum-based metal.

Note that, although aluminum-based metal, in some embodiments, used because it is light, is corrosion resistant, and has excellent processability, in other embodiments of the present application, the pipe and the partition member may be made of a metal-based, stainless steel-based, or iron-based metal around which resin coating or rust preventive is applied.

According to embodiments of the present application, the number of insertion spaces that are partitioned in the pipe by the partition plates of the partition member is two or more, or may be, in some embodiments, three or more. There is no limitation on the upper limit, but, if the number is too large, the proportion in the pipe occupied by the partition member increases, and the volume of the electrical wire insertion spaces decreases. Thus, the number of insertion spaces that are partitioned is eight or less, may be five or less. Specifically, the number may be, in some embodiments, three or four.

Specifically, it may be, in some embodiments, that three-phase high-voltage electrical wires are one by one inserted into the respective electrical wire insertion spaces that are partitioned by the partition member. Thus, if the wire harness includes only the three-phase high-voltage electrical wires, the pipe is partitioned by the partition member into three electrical wire insertion spaces.

For example, in some embodiments, if the wire harness includes the three-phase high-voltage electrical wires and one low-voltage electrical wire for a low-voltage battery circuit, the pipe is partitioned by the partition member into four electrical wire insertion spaces, so that the three-phase high-voltage electrical wires are respectively inserted into the insertion spaces, and the low-voltage electrical wire is inserted into the remaining insertion space.

As described above, according to embodiments of the present application, the external cover material for a wire harness, constituted by a metal partition-attached pipe, is a partition-attached pipe produced by forming the partition member separate from the pipe, and then inserting the partition member into a hollow portion of the pipe. In this manner, if the pipe and the partition member are formed as separate members and assembled later, instead of being unitarily formed by extrusion molding, the wall thickness of the partition member can be made smaller than the wall thickness of the circumferential wall of the pipe. Accordingly, it is possible to realize both the protective function of the pipe as a member for providing protection against interferences from the outside, and the shielding function of improving the shielding performance from the electrical wires by separately providing electrical wire insertion spaces while suppressing a decrease in the volume of the electrical wire insertion spaces inside the pipe.

In the case of separately producing the pipe and the partition member, in some embodiments, the production can be made less difficult and can be easily managed. Moreover, the specification can be changed such that only the pipe or only the partition member is changed, and the versatility of the pipe and the partition member can be expanded.

According to embodiments of the present application, the electrical wires of the wire harness are separately inserted into the plurality of electrical wire insertion spaces that are partitioned by the partition member, an adhesive tape or a cable tie is wound around to fix the inserted electrical wires and the partition member, and the partition member holding the electrical wires is inserted through the pipe.

According to embodiments of the present application, winding cut-outs are provided at an outer circumference of the partition member at intervals in a length direction of the partition member. After the separated electrical wires of the wire harness are inserted in the axial direction into the respective electrical wire insertion spaces that are partitioned by the partition plates, an adhesive tape or a cable tie is placed through the winding cut-outs and is wound around the outer circumference of the electrical wires, so that the electrical wires are fixed to the partition member. In this state, the partition member is inserted into the pipe.

In the case of a radially-shaped partition member, in one embodiment, the winding cut-outs are provided at the same position along the outer circumference of the plurality of partition plates. Thus, in such an embodiment, the winding cut-outs can be easily provided at a desired position by punching the partition member after continuous extrusion molding.

As described above, according to embodiments of the present application, the partition member holding the electrical wires is inserted through the pipe. Since the electrical wires are held by the partition member and inserted through the pipe in this manner, the electrical wires are not bent and damaged during the insertion contrary to the case in which only electrical wires are inserted. According to embodiments of the present application, the operation that inserts the electrical wires through narrow spaces that are partitioned by the partition member does not have to be performed, and, thus, the operation that inserts the electrical wires through the pipe can be made easy.

In some embodiments, it may be that fitting depressions, into which projecting edges at an outer circumference of the partition plates of the partition member are fitted, extend in the axial direction in an inner circumferential face of the pipe.

According to embodiments of the present application, if the projecting edges of the partition plates are fitted into the fitting depressions, the partition member can be positioned inside the pipe. For example, if the number of partition plates is three, three fitting depressions are provided.

According to the first aspect of the present application, the fitting depressions are provided in the inner circumferential face of the pipe at a constant pitch in a circumferential direction thereof, and the edges at the outer circumference of the partition plates are fitted into the fitting depressions at any position, and each of the fitting depressions is a depression having a trapezoidal shape in which both side faces widen in an inward radial direction of the pipe.

According to embodiments of the present application, each of the fitting depressions has a trapezoidal shape in this manner, the fitting depressions can receive the partition plates inserted at various fitting angles, so that the partition member can be fixed in the pipe without wobbling.

According to embodiments of the present application, the partition member holding the electrical wires is inserted through the pipe, and, in this state, the pipe is bent according to a form in which the wire harness is to be arranged. In some embodiments, each of the partition plates of the partition member is provided, at the middle in the radial direction, with at least one bent portion as described above so that the partition member can be easily bent in the bending process. The bent portion functions as a bending fulcrum, and, thus, the partition member can be smoothly bent.

According to embodiments of the present application, a wall thickness of the partition plates of the partition member have a smaller wall thickness than a wall thickness of the pipe.

According to embodiments of the present application, a length of the partition member is longer than a length of the pipe.

According to embodiments of the present application, at least both ends in a length direction of the pipe are partially crimped, so that edges at an outer circumference of the partition member are pressed against and fixed to an inner circumferential face of the pipe.

According to embodiments of the present application, each of the partition plates of the partition member have a bent portion along a radial length of each of the partition plates.

A second aspect of the present application is directed to an external cover material for a wire harness, including:

a metal pipe through which a wire harness including a plurality of electrical wires can be inserted; and a separate metal partition member that is to be assembled by being inserted into the pipe;

wherein a plurality of wire insertion spaces that are partitioned by the partition member and a circumferential wall of the pipe are provided continuously in an axial direction of the pipe, and the pipe is drawn (swaged) throughout the length thereof, or at least both ends in the length direction of the pipe are partially crimped, so that edges at an outer circumference of the partition member are pressed against and fixed to an inner circumferential face of the pipe in order to fix the partition member holding the electrical wires.

According to embodiments of the present application, if the diameter of the pipe is reduced by a swaging process or a partial crimping process as described above, the pipe and the partition member can be fixed. According to embodiments of the present application, even when the outer diameter of the pipe varies, the variations can be corrected by the swaging process.

According to embodiments of the present application, in a state where the pipe and the partition member are fixed, the partition member projects from both ends in the length direction of the pipe, so that the electrical wires held by the partition member are prevented from being brought into contact with the ends of the pipe.

Accordingly, the electrical wires can be prevented from being damaged by contact with the edges at the ends of the pipe.

The wire harness externally covered by the pipe provided with the partition member is arranged in an electric automobile or a hybrid automobile so as to extend from a region above the floor on the rear side, via a through hole of the floor panel, to an underfloor region outside the automobile, and further into the engine room above the floor on the front side. The thus arranged wire harness is connected to a battery above the floor on the rear side, and is connected to an inverter inside the engine room. Alternatively, the wire harness is connected to an inverter above the floor on the rear side, and is connected to a motor above the floor inside the engine room.

Embodiments of the present application can be applied also to a case in which the wire harness is arranged from a region above the floor on the rear side to an underfloor region, and further to a region above the floor at the middle in the length direction of the automobile.

Moreover, the application is not limited to wire harnesses arranged under the floor, and the external cover material can be applied also as an external cover material for wire harnesses that have to be protected from interferences from the outside and that need countermeasures against noise. For example, signal lines that are to be arranged in the engine room may be externally covered by the external cover material constituted by the metal pipe provided with the partition member.

According to a third aspect of the present application, a method for attaching the external cover material to a wire harness. That is to say, embodiments of the present application are directed to methods for attaching an external cover material to a wire harness, including:

inserting separated electrical wires of a wire harness into spaces that are partitioned by the partition member, and fixing the electrical wires and the partition member using a tape or a cable tie;

inserting the partition member holding the electrical wires through the pipe; and drawing or partially crimping the pipe, thereby fixing the partition member and the pipe, and then bending the pipe according to a form in which the wire harness is to be arranged.

Embodiments of the present application further comprise fitting an outer edge of each of a plurality of partition plates of the partition member is into a respective fitted depression of the pipe.

Embodiments of the present application further comprise pressing an inner circumferential face of a circumferential wall of the pipe against an outer edge of each of plurality of partition plates of the partition member.

Embodiments of the present application further comprise prior to inserting the partition member into the pipe, bending, each of a plurality of partition plates of the partition member along a radial length of each of the plurality of partition plates.

As described above, according to embodiments of the present application, the external cover material for a wire harness, constituted by a metal partition-attached pipe, is produced by forming the pipe and the partition member as separate members, and assembling the pipe and the partition member by inserting the partition member through the pipe. Thus, the wall thicknesses of the partition member and the pipe can be made different from each other, so that the thickness of the partition member can be made smaller, and the volume of the electrical wire insertion spaces inside the pipe can be prevented from decreasing. According to embodiments of the present application, if a pipe having various wall thicknesses, outer diameters, or the like is combined with a partition member having various partition shapes, wall thicknesses, or the like, various external cover materials can be provided, that is, external cover materials suitable for a wire harness that is to be inserted therethrough can be provided. In this manner, embodiments of the present application provide various advantages.

BRIEF DESCRIPTION OF DRAWINGS

According to a first embodiment of the present application, where.

According to a second embodiment of the present application.

According to a third embodiment of the present application.

DETAILED DESCRIPTION

FIGS. 1(A) to 6(F) show a first embodiment.

Figure 1A:
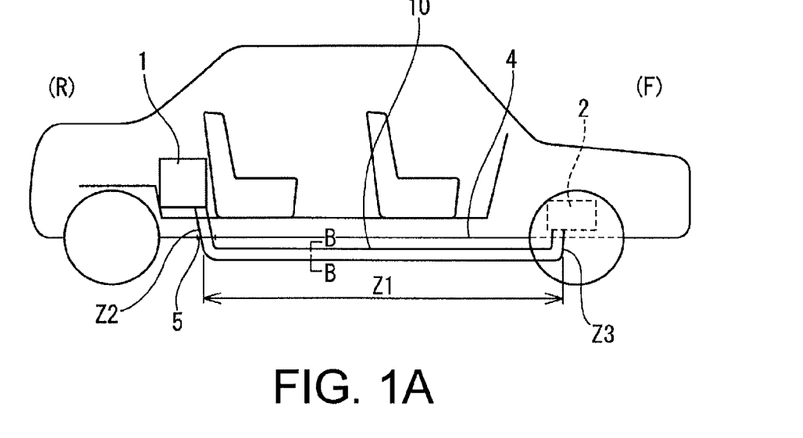
FIG. 1(A) illustrates a schematic overall side view thereof.
Figure 1B:
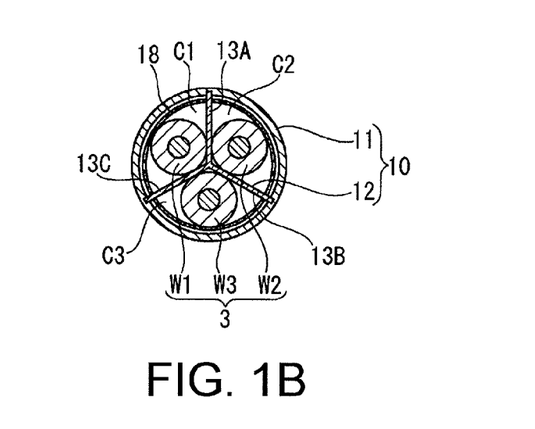
FIG. 1(B) illustrates a cross-sectional view taken along line B-B in FIG. 1(A).

In this embodiment, as shown in FIGS. 1(A) and 1(B), a wire harness 3 including three-phase high-voltage electrical wires W1, W2, and W3 is arranged in a hybrid automobile between a battery 1 mounted above a floor on the rear side and an inverter 2 mounted in an engine room on the front side, wherein the wire harness is arranged in an underfloor region below a floor panel 4, between the regions above the floor on the rear side and on the front side. This underfloor region Z1 of the wire harness is bent upward at both ends in the length direction, forming upward extending regions Z2 and Z3. The upward extending region Z2 is inserted through a through hole 5 formed through the floor panel 4 on the rear side, and the upward extending region Z3 on the front side extends into the engine room.

The wire harness 3 laid out through continuous regions consisting of the underfloor region Z1 and the upward extending regions Z2 and Z3 on both sides thereof is inserted through an external cover material 10 that is constituted by one continuous pipe provided with a partition member. The external cover material 10 is configured such that a partition member 12 is inserted into and fixed to a pipe 11, the partition member 12 and the pipe 11 being made of the same metal. Both of the pipe 11 and the partition member are produced by continuous extrusion molding of molten aluminum-based metal.

Figure 3A:
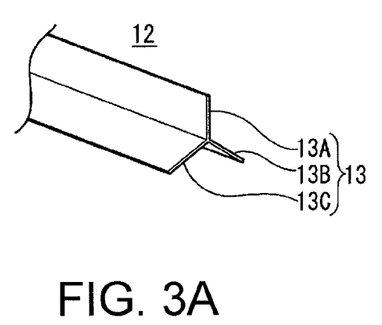
FIG. 3(A) illustrates a perspective view of a partition member and FIG. 3(B) illustrates a front view of the partition member of FIG. 3(A), in accordance with embodiments of the present application.
Figure 3B:
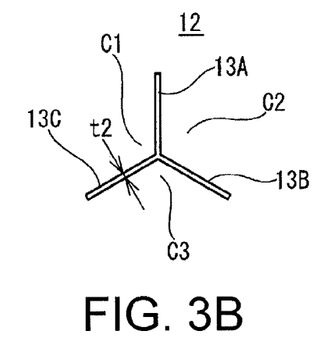

As shown in FIGS. 3(A) and 3(B), the partition member 12 is shaped such that three partition plates 13 (13A, 13B, and 13C) are radially connected to each other at intervals of 120 degrees. When the partition member 12 is attached into a hollow portion 11b of the pipe 11, the outer edges of the three partition plates 13A to 13C are in close contact with the inner face of a circumferential wall 11a of the pipe 11, forming three sealed insertion spaces C (C1, C2, and C3) in the shape of circular sectors enclosed by the partition plates 13 and the circumferential wall 11a. The high-voltage electrical wires W1, W2, and W3 are one by one inserted into the respective insertion spaces C.

The pipe 11 has a wall thickness t1 larger than a wall thickness t2 of the partition plates 13 of the partition member 12.

The pipe 11 and the partition member 12 have a shielding function of preventing noise generated by the high-voltage electrical wires W1 to W3 from diffusing to the outside. The pipe 11 further has a function of protecting the electrical wires from pebbles flicked up from the road or contact with the road.

Figure 2A:
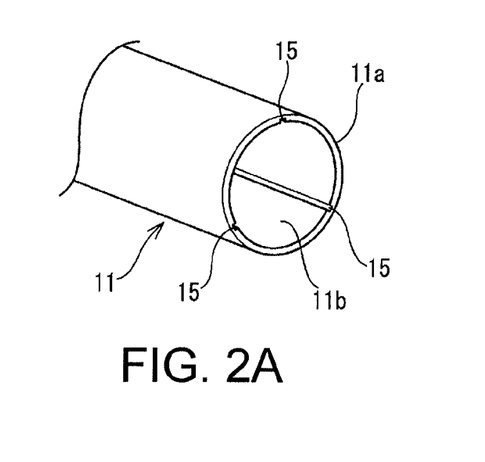
FIG. 2(A) illustrates a perspective view of a pipe and FIG. 2(B) illustrates a front view of the pipe of FIG. 2(A), in accordance with embodiments of the present application.
Figure 2B:
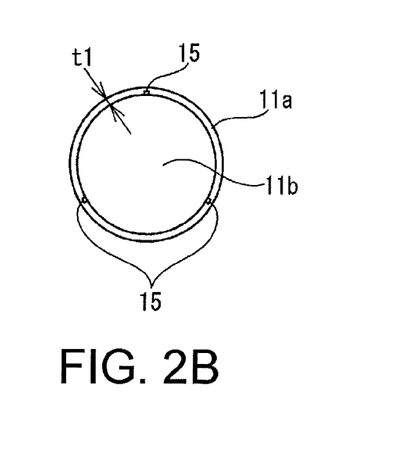

The pipe 11 is produced as a straight pipe by continuous extrusion molding. As shown in FIGS. 2(A) and 2(B), the pipe 11 is shaped such that the hollow portion 11b having a circular cross-section is surrounded by the circumferential wall 11a having a ring-like shape.

Fitting depressions 15 are formed at intervals of 120 degrees throughout the length in the axial direction of the inner circumferential face of the circumferential wall 11a of the pipe 11. The fitting depressions 15 have a size that allows the outer edges in the radial direction of the respective partition plates 13 to be fitted into the fitting depressions 15 without wobbling.

Figure 4A:
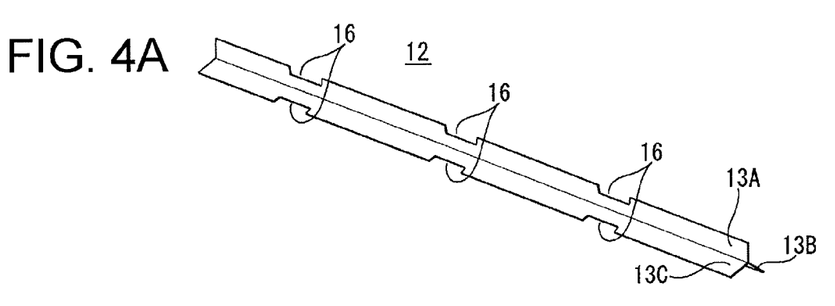
FIG. 4(A) illustrates a perspective view of a partition member provided with winding cut-outs.
Figure 4B:
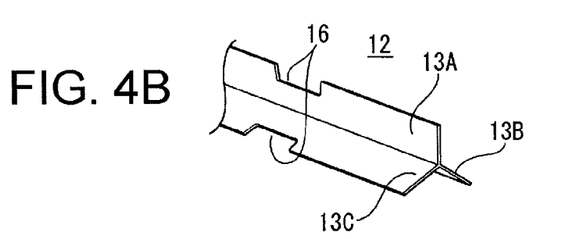
FIG. 4(B) illustrates an enlarged view of the main portion of FIG. 4(A), in accordance with embodiments of the present application.

The partition member 12 shaped such that the three partition plates 13 are radially connected to each other can be produced by extrusion molding as described above. After the molding, as shown in FIGS. 4(A) and 4(B), the outer edges in the radial direction of the three partition plates 13 are punched to form winding cut-outs 16 at intervals in the length direction.

Figure 5:
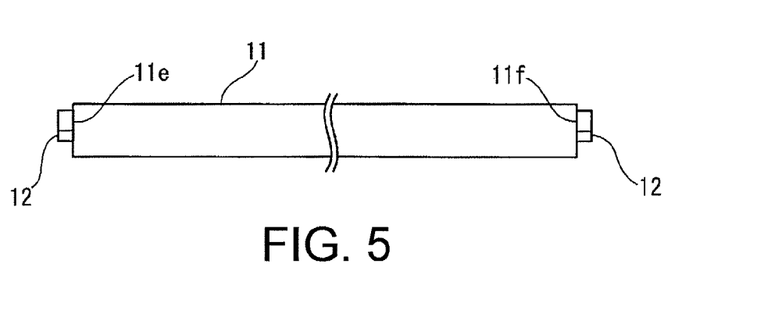
FIG. 5 shows a side view of a state in which the partition member is inserted through the pipe, in accordance with embodiments of the present application.

As shown in FIG. 5, the entire length of the partition member 12 is slightly longer than that of the pipe 11, so that both ends in the length direction of the partition member 12 protrude from both ends 11e and 11f in the length direction of the pipe 11.

According to embodiments of the present application, the inner diameter of the pipe 11 is slightly larger than the virtual outer diameter of the partition member 12 obtained by linking the outer edges of the three partition plates 13, so that the partition member 12 can be easily inserted through the hollow portion 11b of the pipe 11

Next, a method for externally covering the high-voltage electrical wires W1 to W3 with the external cover material 10 constituted by the pipe 11 and the partition member 12 will be described.

Figure 6A:
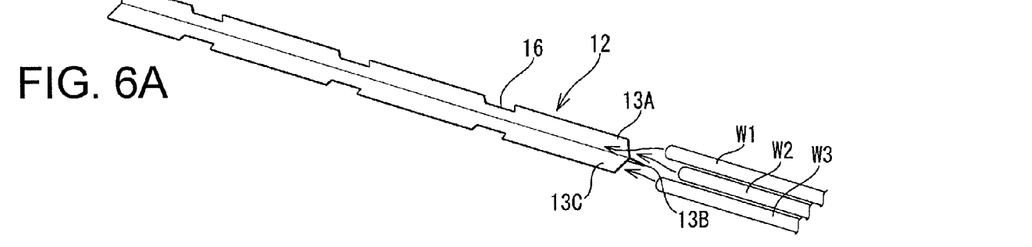
FIGS. 6(A) to 6(F) show views of a process that assembles a wire harness, a partition member, and a pipe, in accordance with embodiments of the present application.
Figure 6B:
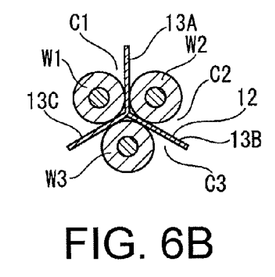

First, as shown in FIGS. 6(A) and 6(B), the high-voltage electrical wires W1 to W3 are one by one inserted into the three insertion spaces C1 to C3 that are partitioned by the partition plates 13A to 13C of the partition member 12 and that each have a circular sector-like cross-section. The electrical wires can be easily attached because they can be inserted into the respective insertion spaces C1 to C3 from a side at a right angle with respect to the axial line.

Figure 6C:
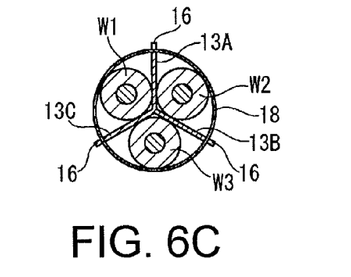
Figure 6D:
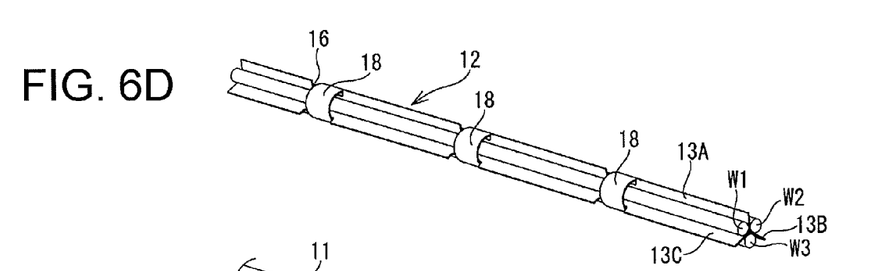

Then, as shown in FIGS. 6(C) and 6(D), adhesive tapes 18 are placed through the winding cut-outs 16 of the three partition plates 13, and are applied to and wound around the outer face of the high-voltage electrical wires W1 to W3, and, thus, the three high-voltage electrical wires W1 to W3 are fixed to and held by the partition member 12. At that time, the high-voltage electrical wires W1 to W3 inserted into the respective insertion spaces C1 to C3 are prevented from protruding out of the outer circumference of the insertion spaces C1 to C3.

Figure 6E:
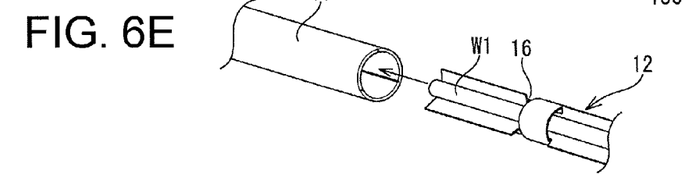

Then, as shown in FIG. 6(E), the partition member 12 holding the high-voltage electrical wires W1 to W3 is inserted into one of the ends in the length direction the pipe 11 toward the other end. At that time, the outer edges in the radial direction of the three partition plates 13A to 13C are fitted into the fitting depressions 15 formed in the inner face of the pipe 11 and are inserted into the axial direction. When the partition member 12 is attached to the pipe 11, openings on the outer circumferential side of the insertion spaces C1 to C3 are closed by the circumferential wall 11a of the pipe 11, forming three sealed spaces. The high-voltage electrical wires W1 to W3 are one by one separately inserted into the respective sealed spaces.

Figure 6F:
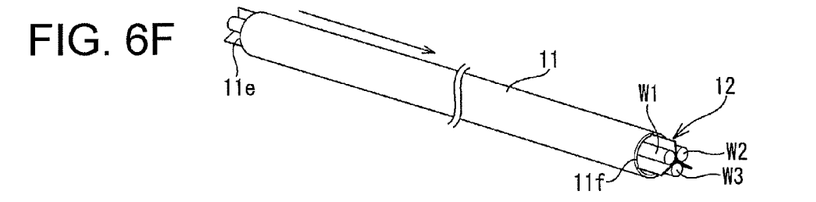

As shown in FIG. 6(F), the inserted partition member 12 is attached such that both ends in the length direction slightly protrude from both ends 11e and 11f of the pipe 11.

Then, a drawing process (swaging process) is performed on the pipe 11 from one end 11e in the length direction toward the other end 11f, so that the diameter of the pipe 11 is reduced. Accordingly, the inner face of the circumferential wall 11a of the pipe 11 is pressed against and fixed to the outer faces of the partition plates 13 of the partition member 12, and, thus, the configuration shown in FIG. 1(B) is obtained.

As shown in FIG. 1(A), the partition-attached pipe 11 has to be bent upward at both ends in front and rear of the underfloor region Z1.

Thus, after the partition member 12 holding the high-voltage electrical wires W1 to W3 is inserted through and fixed to the pipe 11 as shown in FIG. 6(F), the pipe 11 is bent using a bending jig (not shown).

The wire harness 3 externally covered by the external cover material 10 in the above-described process is arranged in an automobile as shown in FIG. 1(A).

FIGS. 7(A) to 9 show a second embodiment.

Figure 7A:
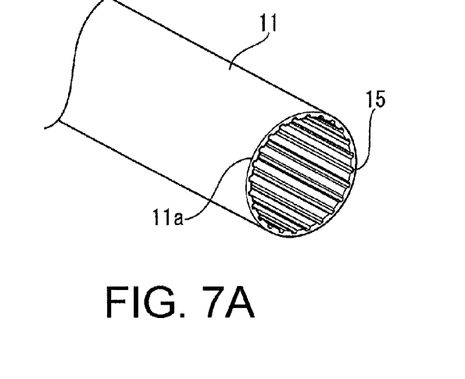
FIG. 7(A) illustrates a perspective view of the pipe of FIG. 7(A)
Figure 7B:
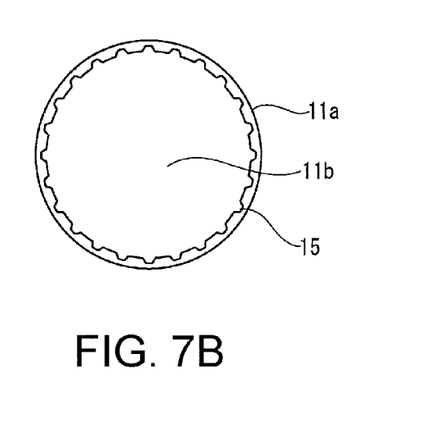
FIG. 7(B) illustrates a front view of the pipe.
Figure 7C:
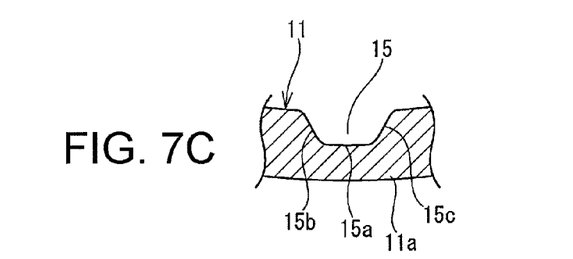
FIG. 7(C) shows an enlarged cross-sectional view of the main portion of the pipe of FIG. 7(A).

In the second embodiment, as shown in FIGS. 7(A)-7(B), a large number of fitting depressions 15 are formed in the inner circumferential face of the circumferential wall 11a of the pipe 11 at a constant pitch in the circumferential direction. As shown in the enlarged view in FIG. 7(C), each of the fitting depressions 15 has a trapezoidal cross-section that widens in an inward radial direction of the pipe, where a bottom face 15a of the fitting depression 15 is arranged between two sides 15b and 15c each having a tapered shape.

Figure 8A:
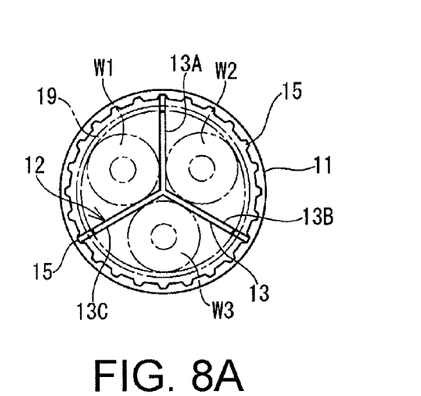
FIGS. 8(A), 8(B), and 8(C) show views of states in which partition members of various types are combined with the pipe according to the second embodiment.
Figure 8B:
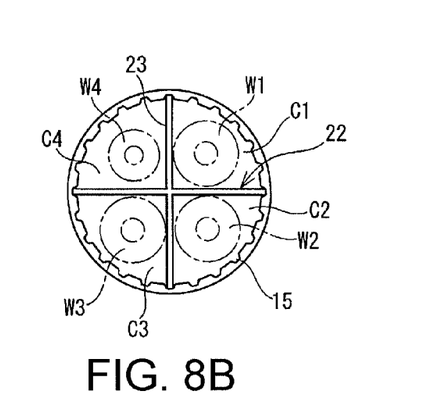
Figure 8C:
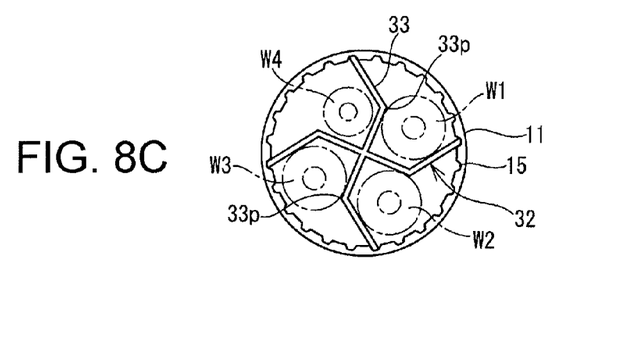

All of a plurality of partition members 12, 22, and 32 can be attached to the pipe 11 as shown in FIGS. 8(A), 8(B), and 8(C). The partition member 12 is a partition member as used in the first embodiment. The partition member 22 is shaped such that four partition plates 23 are radially connected to each other, and partitions the pipe 11 into four insertion spaces C1 to C4. The partition member 32 is shaped such that four partition plates 33 are radially connected to each other, and each of the partition plates 33 is provided, at the middle in the radial direction, with a bent portion 33p.

All of the partition members 12, 22, and 32 are positioned by causing the outer edges in the radial direction of the partition plates 13, 23, and 33 to be fitted into the fitting depressions 15 formed in the inner face of the circumferential wall of the pipe 11. At that time, even when the partition plates 13, 23, and 33 are inserted into the fitting depressions 15 at various angles, the partition plates 13, 23, and 33 are brought into contact with the tapered sides of the fitting depressions 15 and can be held by the fitting depressions 15 without wobbling.

Each of the partition members 22 and 32 partitions the pipe 11 into four insertion spaces C1 to C4. The high-voltage electrical wires W1 to W3 are separately inserted into the three insertion spaces C1 to C3 as in the first embodiment, and a low-voltage electrical wire W4 for one circuit of a low-voltage battery is inserted into the remaining insertion space C4. If the low-voltage electrical wire W4 is partitioned by the partition plates from the high-voltage electrical wires, noise from the high-voltage electrical wires to the low-voltage electrical wire can be blocked or reduced.

According to embodiments of the present application, each of the partition plates 33 of the partition member 32 is bent at the bent portion 33p provided at the middle in the radial direction. If the partition plates 33 are bent in advance in this manner, when bending the partition member 32 together with the pipe 11, the bent portions 33p function as starting points of the bending, and, thus, the partition member 32 can be smoothly bent.

In the second embodiment of the present application, the electrical wires are fixed to the partition members 22 and 32 not using adhesive tapes but using cable ties 19 as shown in FIG. 8(A). The cable ties 19 are placed through the winding cut-outs formed in the partition plates, and are fastened.

Figure 9:
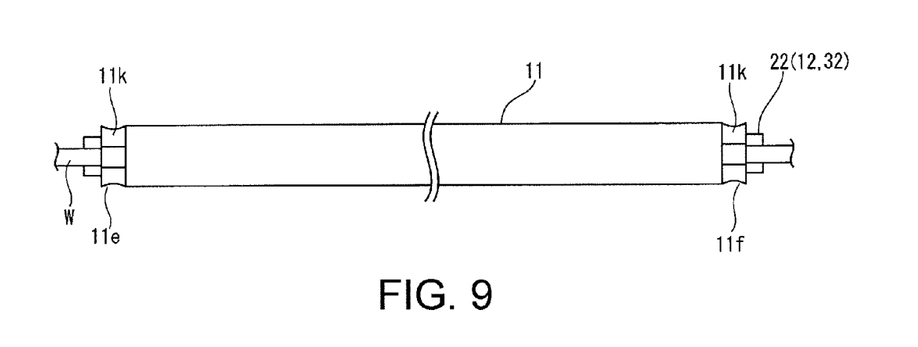
FIG. 9 shows a side view of a structure for fixing the pipe and the partition member according to the second embodiment.

The pipe 11 and the partition member 22 (12 or 32) are fixed as follows. That is, as shown in FIG. 9, both ends 11e and 11f in the length direction of the pipe 11 are partially crimped to form crimped portions 11k having a reduced diameter, and, thus, the pipe 11 and the partition member are fixed.

The configuration other than the above and the assembly method are the same as those in the first embodiment, and, thus, a description thereof has been omitted.

Figure 10A:
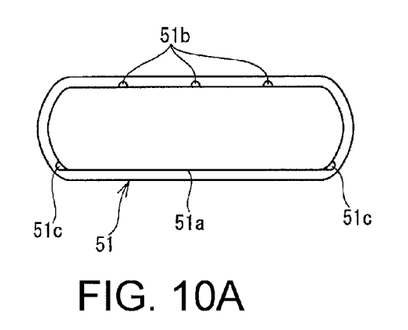
FIG. 10(A) illustrates a front view of a pipe.
Figure 10B:
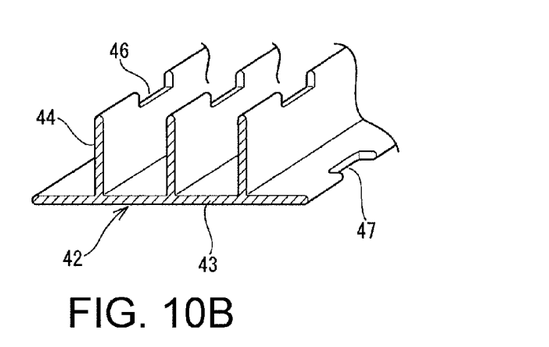
FIG. 10(B) illustrates a perspective view of a partition member.
Figure 10C:
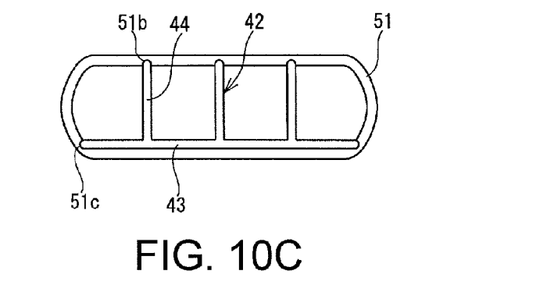
FIG. 10(C) illustrates a front view showing the relationship between the pipe of FIG. 10(A) and the partition member of FIG. 10(B).
Figure 11:
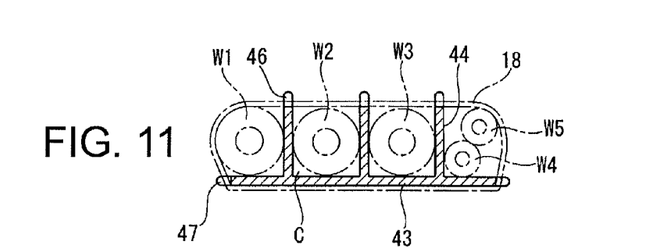
FIG. 11 shows a cross-sectional view of a state in which electrical wires of the wire harness are attached to the partition member according to the third embodiment.

FIGS. 10 and 11 show a third embodiment.

In the third embodiment, as shown in FIGS. 10(A) and 10(C), a metal pipe 51 has a flat oval-like cross-section. According to embodiments of the present application, as shown in FIGS. 10(B) and 10(C), a partition member 42 has a comb-like shape.

The partition member 42 is shaped such that base ends of a plurality of teeth 44 project parallel with each other from a coupling portion 43. As shown in FIG. 10(C), in a state where the coupling portion 43 is in contact with an inner face 51a along one of the sides in the length direction of a pipe 51, both ends of the coupling portion 43 are positioned by being fitted into fitting depressions 51c formed in the inner face of the pipe 51, and projecting ends of the respective teeth 44 are positioned by being fitted into fitting depressions 51b formed in the inner face along the other side of the pipe 51. According to embodiments of the present application, the projecting ends of the teeth 44 and the coupling portion 43 are respectively provided with winding cut-outs 46 and 47 at intervals in the length direction.

Electrical wires W1 to W5 forming a wire harness are separately inserted into insertion spaces C that are partitioned by the teeth 44 of the partition member 42. Then, the adhesive tapes 18 are placed through the winding cut-outs 46 and 47 and wound around the electrical wires W, and, thus, the electrical wires W1 to W5 are fixed to and held by the partition member 42. After being held by the partition member 42 in this manner, the electrical wires W are inserted through the pipe 51 as in the first and the second embodiments. The configuration other than the above and the assembly process are the same as those in the first embodiment, and, thus, a description thereof has been omitted. Further, it will be understood that although specific embodiments have been illustrated and described herein, those of ordinary skill in the art appreciate that any arrangement which is calculated to achieve the same purpose may be substituted for the specific embodiments shown and that embodiments of the invention have other applications in other environments. The present application is intended to cover any adaptations or variations of the present invention. The following claims are in no way intended to limit the scope of embodiments of the invention to the specific embodiments described herein.

LIST OF REFERENCE NUMERALS

3 Wire harness
4 Floor panel
10 External cover material constituted by partition-attached pipe
11 Pipe
12 Partition member
13 Partition plate
15 Fitting depression
16 Winding cut-out
18 Adhesive tape

The invention claimed is:

1. An external cover material for a wire harness, comprising:
a metal pipe through which a wire harness including a plurality of electrical wires can be inserted; and
a separate metal partition member that is to be assembled by being inserted into the pipe;
wherein a plurality of electrical wire insertion spaces that are partitioned by the partition member and a circumferential wall of the pipe are provided continuously in an axial direction of the pipe,
wherein fitting depressions, into which projecting edges at an outer circumference of partition plates of the partition member are fitted, extend in the axial direction in an inner circumferential face of the pipe, and are provided in the inner circumferential face of the pipe at a constant pitch in a circumferential direction of the pipe,
wherein the edges at the outer circumference of the partition plates are fitted into the fitting depressions at any position of the fitting depressions provided at the constant pitch, and
wherein each of the fitting depressions comprises a depression having a trapezoidal shape in which both side faces widen in an inward radial direction of the pipe.

2. The external cover material for a wire harness, according to claim 1,
wherein the pipe and the partition member are produced by extrusion molding of molten metal such as aluminum-based metal,
wherein the pipe is constituted only by a circumferential wall surrounding a hollow portion, and has any one of a circular, a substantially flat oval, or an elliptical cross-section, and
wherein the partition member is shaped such that a plurality of partition plates are radially connected to each other, or such that a plurality of partition plates are provided as teeth that project from a coupling plate.

3. The external cover material for a wire harness, according to claim 1,
wherein the electrical wires of the wire harness are separately inserted into the plurality of electrical wire insertion spaces that are partitioned by the partition member,
wherein an adhesive tape or a cable tie is wound around to fix the inserted electrical wires and the partition member, and
wherein the partition member holding the electrical wires is inserted through the pipe.

4. The external cover material for a wire harness, according to claim 3, wherein winding cut-outs are provided at an outer circumference of the partition plates at intervals in a length direction of the partition plates.

5. The external cover material for a wire harness, according to claim 1, wherein a wall thickness of the partition plates of the partition member have a smaller wall thickness than a wall thickness of the pipe.

6. The external cover material for a wire harness, according to claim 1, wherein a length of the partition member is longer than a length of the pipe.

7. The external cover material for a wire harness, according to claim 1, wherein at least both ends in a length direction of the pipe are partially crimped, so that edges at an outer circumference of the partition member are pressed against and fixed to an inner circumferential face of the pipe.

8. The external cover material for a wire harness, according to claim 1, wherein each of the partition plates of the partition member have a bent portion along a radial length of each of the partition plates.

9. An external cover material for a wire harness, comprising:
a metal pipe through which a wire harness including a plurality of electrical wires can be inserted; and
a separate metal partition member that is to be assembled by being inserted into the pipe,
wherein a plurality of electrical wire insertion spaces that are partitioned by the partition member and a circumferential wall of the pipe are provided continuously in an axial direction of the pipe, and
wherein the pipe is swaged throughout the length of the pipe, or at least both ends in the length direction of the pipe are partially crimped, so that edges at an outer circumference of the partition member are pressed against and fixed to an inner circumferential face of the pipe,
wherein fitting depressions, into which projecting edges at an outer circumference of partition plates of the partition member are fitted, extend in the axial direction in an inner circumferential face of the pipe, and are provided in the inner circumferential face of the pipe at a constant pitch in a circumferential direction of the pipe
wherein each of the fitting depressions comprises a depression having a trapezoidal shape in which both side faces widen in an inward radial direction of the pipe.

10. A method for attaching an external cover material to a wire harness, comprising:
- inserting separated electrical wires of a wire harness into spaces that are partitioned by the partition member;
- fixing the electrical wires and the partition member using a tape or a cable tie;
- inserting the partition member holding the electrical wires through the pipe;
- drawing or partially crimping the pipe, thereby fixing the partition member and the pipe, and then bending the pipe according to a form in which the wire harness is to be arranged; and
- providing fitting depressions in the inner circumferential face of the pipe at a constant pitch in a circumferential direction of the pipe, the fitting depressions being where projecting edges at an outer circumference of partition plates of the partition member are fitted, and extend in the axial direction in an inner circumferential face of the pipe, each of the fitting depressions comprises a depression having a trapezoidal shape in which both side faces widen in an inward radial direction of the pipe.

11. The method for attaching the external cover material to the wire harness, according to claim 10, further comprising:
- fitting an outer edge of each of a plurality of partition plates of the partition member is into a respective fitted depression of the pipe.

12. The method for attaching the external cover material to the wire harness, according to claim 10, further comprising:
- pressing an inner circumferential face of a circumferential wall of the pipe against an outer edge of each of plurality of partition plates of the partition member.

13. The method for attaching the external cover material to the wire harness, according to claim 10, further comprising:
- prior to inserting the partition member into the pipe, bending, each of a plurality of partition plates of the partition member along a radial length of each of the plurality of partition plates.

* * * * *